(12) United States Patent
Mian (10) Patent No.: US 8,423,240 B2
(45) Date of Patent: Apr. 16, 2013

(54) WIRELESS RAILROAD MONITORING (75) Inventor: Zahid F. Mian, Loudonville, NY (US)

(73) Assignee: International Electronic Machines Corporation, Troy, NY (US)

( * ) Notice: Subject to any disclaimer, the term of this patent is extended or adjusted under 35 U.S.C. 154(b) by 602 days.

(21) Appl. No.: 12/493,789

(22) Filed: Jun. 29, 2009

(65) Prior Publication Data

US 2009/0326746 A1 Dec. 31, 2009

Related U.S. Application Data (60) Provisional application No. 61/129,487, filed on Jun. 30, 2008.

(51) Int. Cl.
G06F 7/00 (2006.01)

(52) U.S. Cl.
USPC .................................. 701/36; 701/1; 701/19

(58) Field of Classification Search ................ 701/1, 19; 342/357.33
See application file for complete search history.

(56) References Cited

U.S. PATENT DOCUMENTS

| | | | | |
|---|---|---|---|---|
| 4,128,218 | A * | 12/1978 | Pohlig | 246/247 |
| 4,768,740 | A * | 9/1988 | Corrie | 246/25 |
| 5,164,732 | A * | 11/1992 | Brockelsby et al. | 342/44 |
| 5,265,831 | A * | 11/1993 | Muller | 246/124 |
| 5,809,448 | A * | 9/1998 | Gimenez et al. | 701/213 |
| 6,292,112 | B1 * | 9/2001 | Bader et al. | 340/941 |
| 6,397,130 | B1 * | 5/2002 | Carr et al. | 701/19 |
| 6,439,513 | B1 * | 8/2002 | Pascoe | 246/122 R |
| 2006/0076461 | A1 * | 4/2006 | DeRose et al. | 246/122 R |
| 2006/0118678 | A1 * | 6/2006 | Wells et al. | 246/121 |
| 2007/0062299 | A1 | 3/2007 | Mian et al. | |

OTHER PUBLICATIONS

S.W. Arms et al.; Tracking Pitch Link Dynamic Loads w/ Energy Harvesting Wireless Sensors, www.microstrain.com, May 2007, 41 pages.
ANT11TR21M2xB RF Transceiver Module, Dynastream Innovations Inc., Revision 2.1, pp. 1-14, 2007, Cochrane, Alberta.
EM260-802.15.4 and ZigBee Compliant Network Co-processor, Ember Corporation, 2 pages, 2008.
Getting Started With MSP430 from Texas Instruments, printed from http://focus.ti.com/mcu/docs/mcugettingstarteddetail. tsp?sectionId=97&tabId=1511&famil . . . . on Apr. 17, 2009, 3 pages.
Wireless Network Uses "Smart Dust" Technology, SAIC Magazine, 2 pages, Winter 2004/2005.
Crossbow IMOTE2.Builder—Wireless Sensors for Everyone, Crossbow, 5 pages, date unknown.
uPSD3300 series—Turbo 8032 Microcontroller With Programmable Logic, STMicroelectronics, 2 pages, Aug. 2003.
Zarlink Introduces World's First Wireless Chip Designed Specifically for In-Body Communication, printed from htto://www.zarlink.com/zarlink/hs/press_releases_7658_htm, 3 pages, May 31, 2005.

* cited by examiner

*Primary Examiner* — Khoi Tran
*Assistant Examiner* — Bhavesh V Amin
(74) *Attorney, Agent, or Firm* — LaBatt, LLC (57) ABSTRACT

A sensor node configured to acquire sensor data on one or more properties of a railroad environment, wirelessly transmit data related to the property(ies), and generate sufficient power to operate the sensor node without access to any additional power sources is provided. The sensor node can be deployed as part of a group of sensor nodes, which provide data for use by a railroad system in monitoring and/or controlling the railroad environment. In this manner, various properties of the railroad environment can be monitored without requiring significant wiring to the various sensor nodes.

20 Claims, 6 Drawing Sheets

WIRELESS RAILROAD MONITORING

REFERENCE TO PRIOR APPLICATIONS

The current application claims the benefit of U.S. Provisional Application No. 61/129,487, titled "Self-powered wireless railroad infrastructure sensor network," which was filed on 30 Jun. 2008, and which is hereby incorporated by reference. Aspects of the invention are related to U.S. Utility patent application Ser. No. 12/469,167, titled "Sensor System," which was filed on May 20, 2009, and which is hereby incorporated by reference.

TECHNICAL FIELD

The disclosure relates generally to monitoring railroad operations, and more particularly, to a solution that includes independent, wireless sensor nodes configured to monitor one or more aspects of the railroad operations.

BACKGROUND ART

A wide variety of sensors are used in railroad settings. These sensors and illustrative applications include: wheel detectors, which are often used in railway operation to monitor train traffic; accelerometers, which can be used to detect impacts of flat wheels; strain gauges, which can be used to measure an amount of strain placed on a rail due to a passing rail vehicle; microphones, which can be used to detect the sound of worn bearings; heat detectors, which can be used to identify locations of abnormal amounts of friction; and the like. A typical rail main line can have thousands of miles of track circuits run for signaling and for track integrity/continuity detection (i.e., detecting a break in the track).

To date, wheel detectors, and most other types of sensors, need to be supplied with electrical current and connected to a controller or another form of processing hardware to utilize the capabilities of the sensors. In a typical rail yard, many hundreds of yards of wiring need to be run from the various sensors to control or data processing hardware to implement a rail yard monitoring/automation system. Such wiring substantially increases the installation and maintenance costs for such a system.

SUMMARY OF THE INVENTION

The invention proposes a railroad monitoring solution that does not require physical power or communications connections to the various sensors. In particular, an embodiment of the solution includes sensor nodes that are configured to acquire data and transmit the data using a wireless communications solution with power generated only from the rail operations. In this manner, the solution can be more readily deployed wherever desired in the rail industry in a permanent or temporary manner. Embodiments of the solution differ drastically from the state of the art in terms of cost to implement, ease of implementation, technology, and flexibility of utility. As a result, the solution provides more efficient, reliable, and flexible solutions for monitoring and controlling rail operations and maintaining the rail infrastructure.

Aspects of the invention provide a sensor node configured to acquire sensor data on one or more properties of a railroad environment, wirelessly transmit data related to the property(ies), and generate sufficient power to operate the sensor node without access to any additional power sources. The sensor node can be deployed as part of a group of sensor nodes, which provide data for use by a railroad system in monitoring and/or controlling the railroad environment. In this manner, various properties of the railroad environment can be monitored without requiring significant wiring to the various sensor nodes.

A first aspect of the invention provides a sensor node comprising: a sensor component configured to acquire sensor data on at least one property of a railroad environment; a wireless data communications component configured to transmit data related to the at least one property using a wireless communications solution; and a power harvesting component configured to generate power from motion of a rail vehicle and provide sufficient power to operate the sensor node without access to any additional power sources.

A second aspect of the invention provides a railroad monitoring system comprising: a set of sensor nodes, each sensor node comprising: a sensor component configured to acquire sensor data on at least one property of a railroad environment; a wireless data communications component configured to transmit data related to the at least one property using a wireless communications solution; and a power harvesting component configured to generate power from motion of a rail vehicle and provide sufficient power to operate the sensor node without access to any additional power sources; and a railroad system configured to monitor the at least one aspect of the railroad environment using the data received from the set of sensor nodes.

A third aspect of the invention provides a sensor node comprising: a sensor component configured to acquire sensor data on at least one property of a railroad environment; a wireless data communications component configured to transmit data related to the at least one property using a wireless communications solution; a data processing component configured to process the sensor data for transmission using the wireless data communications component; and a power harvesting component configured to generate power from motion of a rail vehicle and provide sufficient power to operate the sensor node without access to any additional power sources, wherein the power harvesting component includes noncontact electromagnetic power generating means.

The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a sensor node configured to acquire sensor data on one or more properties of a railroad environment, wirelessly transmit data related to the property(ies), and generate sufficient power to operate the sensor node without access to any additional power sources. The sensor node can be deployed as part of a group of sensor nodes, which provide data for use by a railroad system in monitoring and/or controlling the railroad environment. In this manner, various properties of the railroad environment can be monitored without requiring significant wiring to the various sensor nodes. As used herein, unless otherwise noted, the term "set" means one or more (i.e., at least one) and the phrase "any solution" means any now known or later developed solution.

Figure 1A:
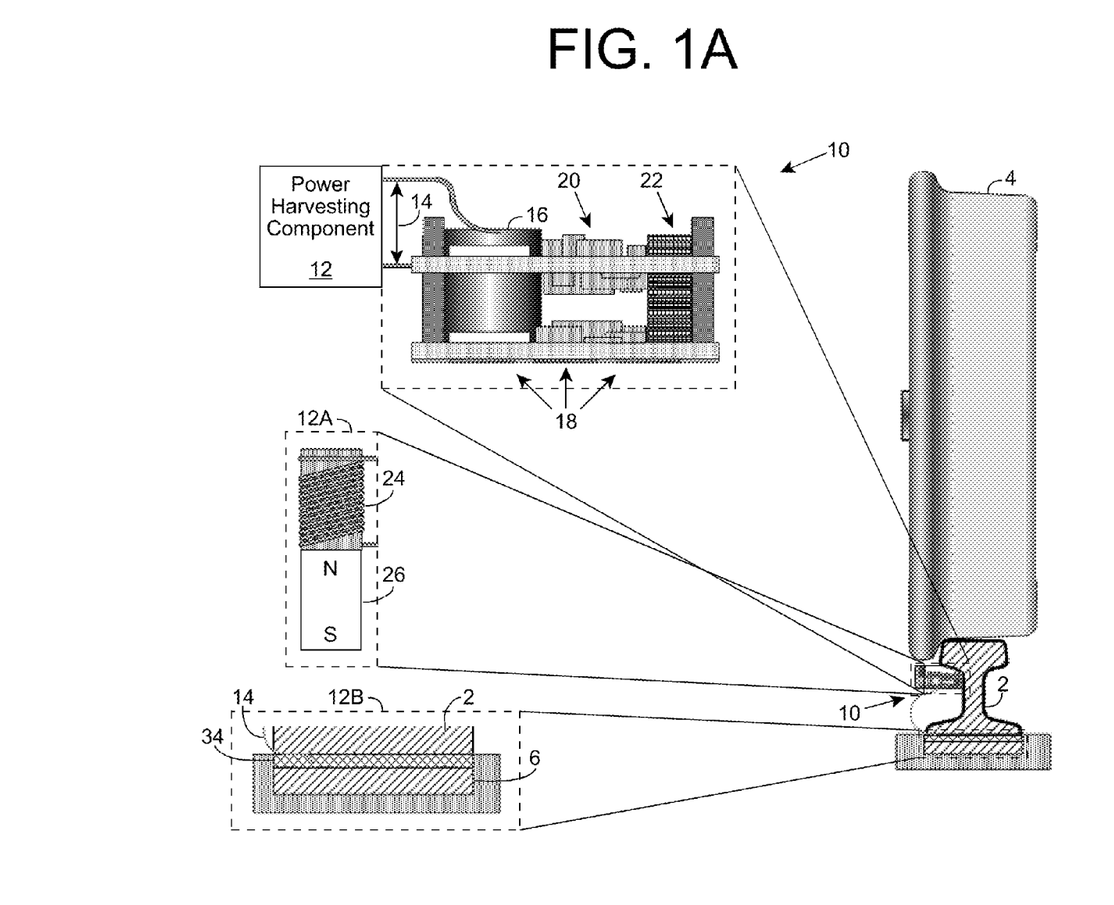
FIGS. 1A and 1B show an illustrative wireless sensor node according to an embodiment.
Figure 1B:
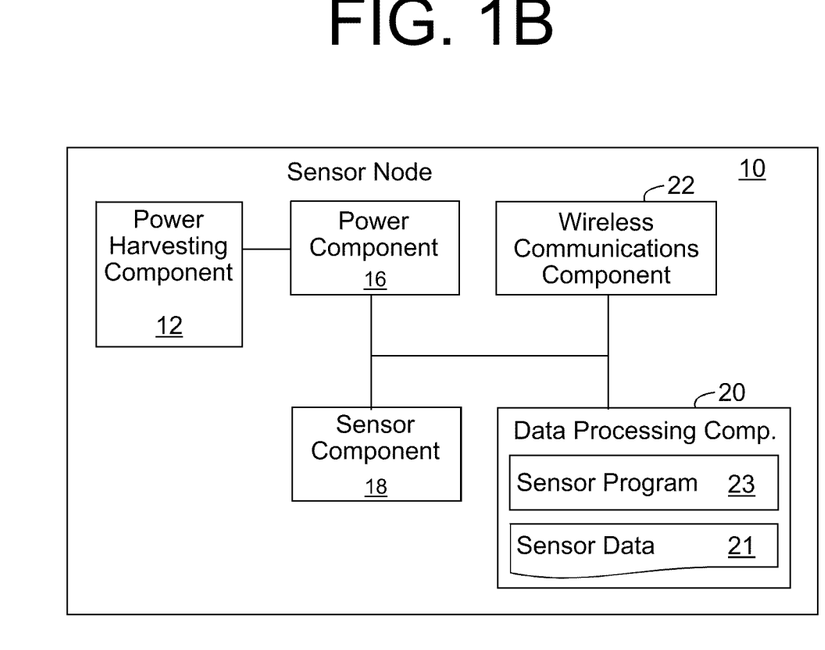

Turning to the drawings, FIGS. 1A and 1B show an illustrative wireless sensor node 10 according to an embodiment. As illustrated, some or all of sensor node 10 can be attached to a rail 2 on which a rail wheel 4 travels, and is configured to measure one or more aspects of rail operation. Sensor node 10 can be entirely contained within a single physical structure that is attached to rail 2 at a location below a head portion of rail 2 on a gauge side of rail 2. Sensor node 10 can be attached to rail 2 using any solution, such as clamping sensor node 10 to a base of rail 2, attaching sensor node 10 to a side of the rail 2 by welding, gluing, or magnets, and/or the like. However, it is understood that sensor node 10 can be located in any desired location adjacent to rail 2, which is not susceptible to being struck by moving equipment on a passing rail vehicle, having its operation impeded by external elements, and/or the like. For example, sensor node 10 can be located on the field side of rail 2. The location of sensor node 10 can be selected based on the corresponding attribute(s) of the rail operation for which sensor node 10 is configured to acquire measurements. In an embodiment, sensor node 10 has dimensions of approximately a few inches or less.

Sensor node 10 can include a set of power harvesting components 12, each of which is configured to generate power for the operation of other components of sensor node 10. In an embodiment, the set of power harvesting components 12 generate sufficient power to operate the various components of sensor node 10 without requiring access to any additional power sources (e.g., connection to an external electrical grid). In an embodiment, sensor node 10 requires less than two milliwatts of power for full operation, which can be provided by a set of power harvesting components 12 described herein. While shown adjacent to the remaining components of sensor node 10, it is understood that a power harvesting component 12 can be located anywhere with respect to the remaining components of sensor node 10. In an embodiment, power harvesting component 12 is physically located together with the remaining components of sensor node 10 in a single physical structure. In this case, sensor node 10 requires no external wiring.

A power harvesting component 12 can generate electrical current from one or more attributes of the operating environment surrounding the power harvesting component 12. The set of power harvesting components 12 can include one or more power harvesting components 12 configured to generate power from an ambient condition of the operating environment, e.g., solar or wind-based power generators. The electrical current can be channeled into a power connection 14 for storage and/or use in operating other components of sensor node 10. To this extent, sensor node 10 can include a power component 16, electrically connected to power connection 14, which is configured to regulate and/or store the power supplied by the set of power harvesting components 12 and distribute the power for operating one or more components of sensor node 10. Power component 16 can include any combination of various power storage, regulating, and/or storage components including, but not limited to, a battery, a supercapacitor, a power regulator, a power conditioning component, and/or the like. The power can be utilized by the various other components of sensor node 10 including, but not limited to, a sensor component 18, a data processing component 20, a wireless communications component 22, and/or the like.

The sensor component 18 can be configured to acquire data relating to various aspects of the rail operation including, but not limited to, wheel 4 passage and direction, strain on rail 2, vibration, impact, sound, rail 2 continuity, heat/infrared, and/or the like. To this extent, sensor component 18 can comprise one or more sensors to measure vibration, strain, heat, sound, and/or the like. Additionally, sensor component 18 can comprise various ancillary components, including but not limited to, bridge resistors, signal conditioning devices, and/or the like. In any event, sensor component 18 can provide data relating to the one or more aspects of the rail operation for processing by data processing component 20.

The data processing component 20 can be configured to perform sensor data 21 acquisition, processing, storage, and/or retrieval. To this extent, data processing component 20 can comprise one or more mini-controllers or microprocessors configured to execute program code, such as sensor program 23, data storage component(s), sensor interfaces, and/or other control components. Data processing component 20 can perform varying amounts of processing of the sensor data 21. For example, data processing component 20 can be configured to receive sensor data 21 from sensor component 18, store the sensor data 21 using a data storage component, and package the sensor data 21 in one or more messages for transmission to another computer system. Further, data processing component 20 can be configured to perform data analysis and/or pre-processing on the sensor data 21 prior to storage and/or transmission. Still further, data processing component 20 can be configured to direct or control the operation of one or more other computer systems and/or sensor nodes 10 in response to the data analysis. For example, a sensor node 10 can trigger other sensor nodes 10 to take readings, power up/down, and/or the like, e.g., in response to detecting the presence of an approaching train.

The wireless communications component 22 can be configured to transmit data relating to the sensor data for processing by another computer system using any wireless solution. Additionally, wireless communications component 22 can be configured to receive data transmitted by another computer system using a wireless solution, which can be utilized to adjust the operation of data processing component 20 and/or sensor component 18. Wireless communications component 22 can implement any solution for wirelessly transmitting and/or receiving data. For example, wireless communications component 22 can include: a transmission circuit configured to communicate data by varying a fundamental circuit frequency, amplitude, and/or the like; a radio on a chip (RoC) transceiver; and/or the like.

In an embodiment, sensor node 10 is manufactured using distinct components that can be separately developed and matched according to a particular application as shown and described in U.S. Utility patent application Ser. No. 12/469,167, titled "Sensor System," which was filed on May 20, 2009, and which is hereby incorporated by reference. In this case, sensor node 10 can provide an ability to change the particular sensor(s), the particular data collection and communications of the node, and/or the power source used to run them without requiring a re-design of the entire sensor node 10. For example, sensor node 10 can include a core component, e.g., implemented as a core board including a power and programming interface, a multiple input sensing interface interface, a microprocessor/microcontroller 20, a wireless communications component 22 (e.g., transceiver and antenna connectors/integrated antenna), power regulators, onboard memory/data storage, and/or the like. Further, sensor node 10 can include a sensor component 18, e.g., implemented as a sensor board, which includes one or more of various types of sensors and the corresponding sensor support circuitry and includes a connector that is configured to interface with the core component through the multiple input sensing interface on the core board. Still further, the sensor node 10 can include a power component 16, e.g., implemented as a power board, which includes a connector configured to interface with the core component through the power/programming interface on the core board, and includes one or more of any type of power sources capable of providing power to the core component and the sensor component.

In any event, the set of power harvesting components 12 can be configured to generate sufficient power from the ambient conditions to operate the remaining components of sensor node 10 without requiring any access to an additional power source, requiring periodic battery changes, and/or the like. In an embodiment, a power harvesting component 12 generates power for sensor node 10 from the motion of a rail vehicle moving past the power harvesting component 12. For example, sensor node 10 can include a power harvesting component 12A configured to generate power using a non-contact electromagnetic power generation solution. Power harvesting component 12A comprises a ferrous-cored coil 24 with a bias magnet 26, which can generate power as the wheel 4 passes nearby. Bias magnet 26 can be a strong magnet, which will allow for a significant change in field strength, such as a rare-earth magnet. In an embodiment, power harvesting component 12A is located on the gauge side of rail 2 such that a flange of the wheel 4 passes directly over power harvesting component 12A. In this manner, power harvesting component 12A can be located lower on rail 2 while still having a portion of wheel 4 pass sufficiently close to enable power generation. Alternatively, sensor node 10 and power harvesting component 12A can be located on a field side of rail 2, in which case energy can be generated from the passage of the wheel 4 rim.

Figure 2:
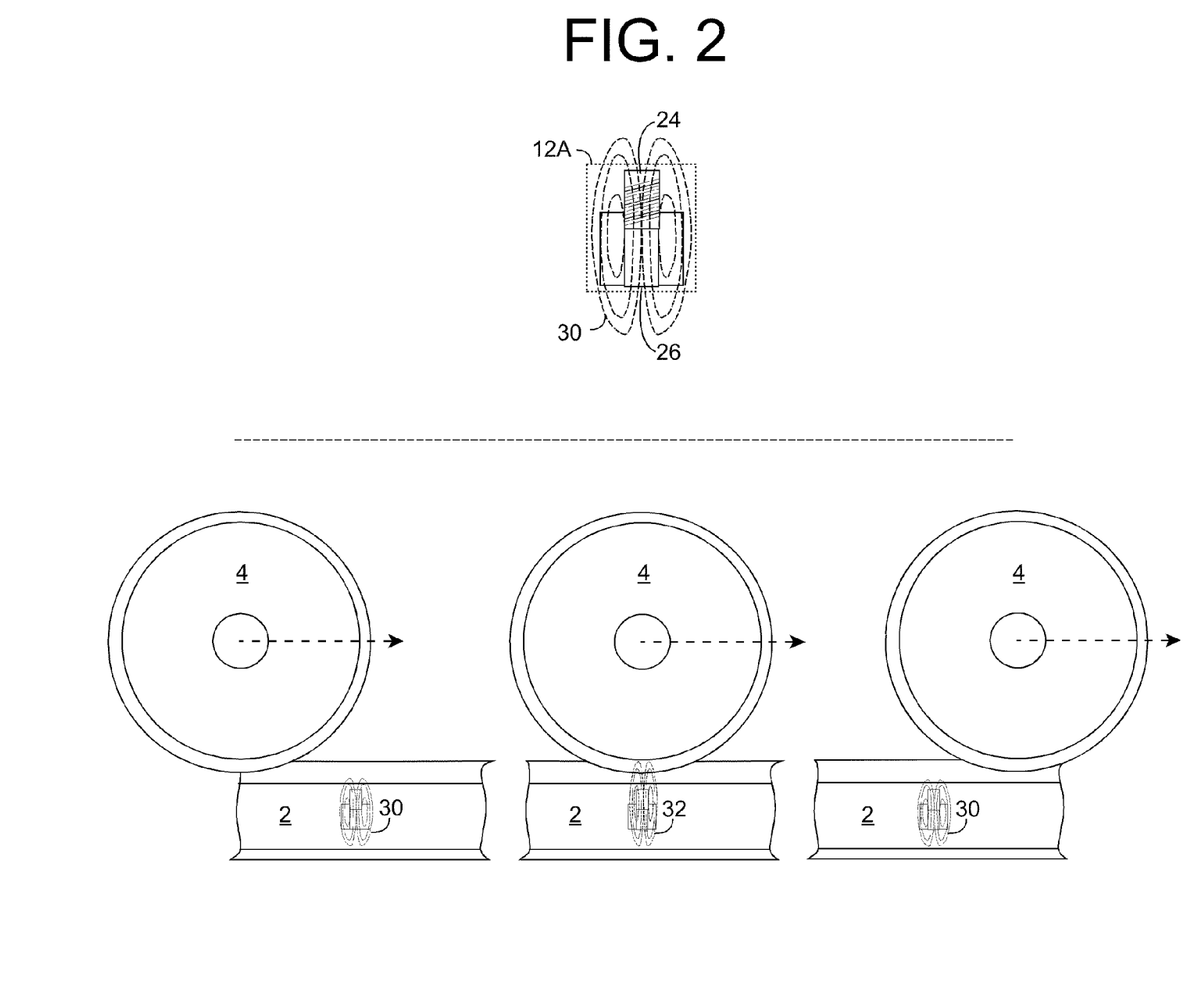
FIG. 2 illustrates electromagnetic power generation using an illustrative power harvesting component of FIGS. 1A and 1B according to an embodiment.

FIG. 2 illustrates electromagnetic power generation using power harvesting component 12A according to an embodiment. As shown in the top portion of FIG. 2, ferrous-cored coil 24 and bias magnet 26 together create a magnetic field of a first configuration 30, which can be derived from specific characteristics of coil 24 and bias magnet 26. As illustrated in the bottom portion of FIG. 2, as a wheel 4 passes close to power harvesting component 12A, the presence of a large quantity of ferrous metal in wheel 4 causes the magnetic field created by power harvesting component 12A to extend, eventually reaching the magnetic field of a second configuration 32 when the wheel 4 is at its closest point to power harvesting component 12A. As wheel 4 leaves the vicinity of power harvesting component 12A, the magnetic field returns to the first configuration 30. The change in magnetic fields caused by wheel 4 induces an electrical current in coil 24, which can be channeled into a power connection 14 (FIG. 1A) for storage and/or use. Since each wheel 4 is massive and moves quickly in proportion to a size of a sensor node 10 (e.g., on a scale of a few inches), the electrical generation potential, with an appropriate design of coils and magnets, is significant for typical wireless sensor node 10 applications. In an embodiment, power harvesting component 12A can generate several milliwatts of power (possibly tens or even hundreds of milliwatts at peak) for each passing wheel 4. The power is generated for a duration that is relative to the speed of the passing wheel 4; peak power generation generally increases with speed, while the duration drops.

It is understood that power harvesting component 12A is only illustrative of numerous configurations for generating power using a noncontact electromagnetic power generation solution. For example, power harvesting component 12A can be modified such that the magnet 26 is also the core of a coil 24 itself, the coil 24 does not have a ferrous core, and/or the like. In another embodiment, a linear row of coils 24 with a magnetic bias can be utilized to generate electrical current from the motion of the wheels 4. Additionally, electrical current can be generated by a magnet 26 mounted on a cantilever or rotating arm, which swings with the motion of wheel 4 in a stationary coil field.

Returning to FIGS. 1A and 1B, sensor node 10 can acquire power from a power harvesting component 12 configured to generate power from one or more effects of the motion of the rail vehicle(s) and the corresponding wheels 4 (e.g., strain, vibration, and/or the like) on the rail 2. For example, a power harvesting component 12B can comprise a sheet of piezoelectric material 34 disposed between rail 2 and a base plate 6 for the rail 2. Piezoelectric material 34 can comprise any type of material that generates electrical energy when struck or deformed, e.g., lead zirconium titanate (PZT). In this case, passage of a series of rail vehicles along rail 2 above piezoelectric material 34 can cause significant power to be generated through the resulting variation of strain on the material 34, which can be channeled through a power connection 14 for use by sensor node 10. A size and/or thickness of piezoelectric material 34 can be selected based on the stresses encountered and an amount of power desired using any solution. Piezoelectric material 34 can be inserted between rail 2 and a standard base plate 6 or piezoelectric material 34 can be affixed to rail 2 and/or base plate 6 using any solution (e.g., adhesive). In an embodiment, a custom base plate 6 including piezoelectric material 34 attached thereto is used in place of a standard base plate 6.

It is understood that there are numerous other embodiments for harvesting power for operating a sensor node 10. For example, the passage of wheel 4 over rail 2 also produces a substantial amount of strain in the rail 2 as well as the base plate 6. To this extent, an embodiment off a power harvesting component 12 can include piezoelectric material applied to the rail 2, which could provide significant energy for use by sensor node 10. Other embodiments of power harvesting component 12 can utilize piezoelectric material, an electromagnetic power generating component, or the like, to generate energy from the vibration of passing trains. Still further, in higher speed applications, a power harvesting component 12 can generate energy from the wind of a passing train. Further, sensor node 10 can acquire power from a power harvesting component 12 configured to generate power from an ambient condition unrelated to the operation of the rail. For example, sensor node 10 can include a power harvesting component 12 comprising a solar cell, which can be configured to generate power from sunlight, e.g., for applications where rail vehicles are not expected to be constantly covering the location of the sensor node 10. Still further, it is understood that sensor node 10 could be implemented without a power harvesting component 12, and can include a battery or the like, which will require periodic replacement.

Additionally, while sensor node 10 is shown including a separate power harvesting component 12 and sensor component 18, it is understood that power harvesting component 12 can also perform sensing functions. For example, power harvesting component 12A can detect a presence of a wheel 4 through analysis of the waveform generated by the passage of the wheel 4 and comparison with an expected waveform for a wheel 4. In an illustrative embodiment, a sensor node 10 configured to sense a wheel 4 can comprise power harvesting component 12A, power component 16 (e.g., including power regulation/conditioning circuitry), a very low-power sensor interface for sampling the power harvesting component 12A, and a wireless transceiver 22. In operation, the power harvesting component 12A provides a signal of the passage of wheel 4 as a curve of power generation. The sensor interface can analyze the shape of the curve to determine an exact moment of passage (e.g., defined as the moment at which the wheel axle is top dead center of the wheel 4). Even when a wheel 4 passes over the sensor node 10 at a very low speed, energy stored in power component 16 can be used to generate a signal of the presence of the wheel 4 for processing by a remote computer system.

Figure 3:
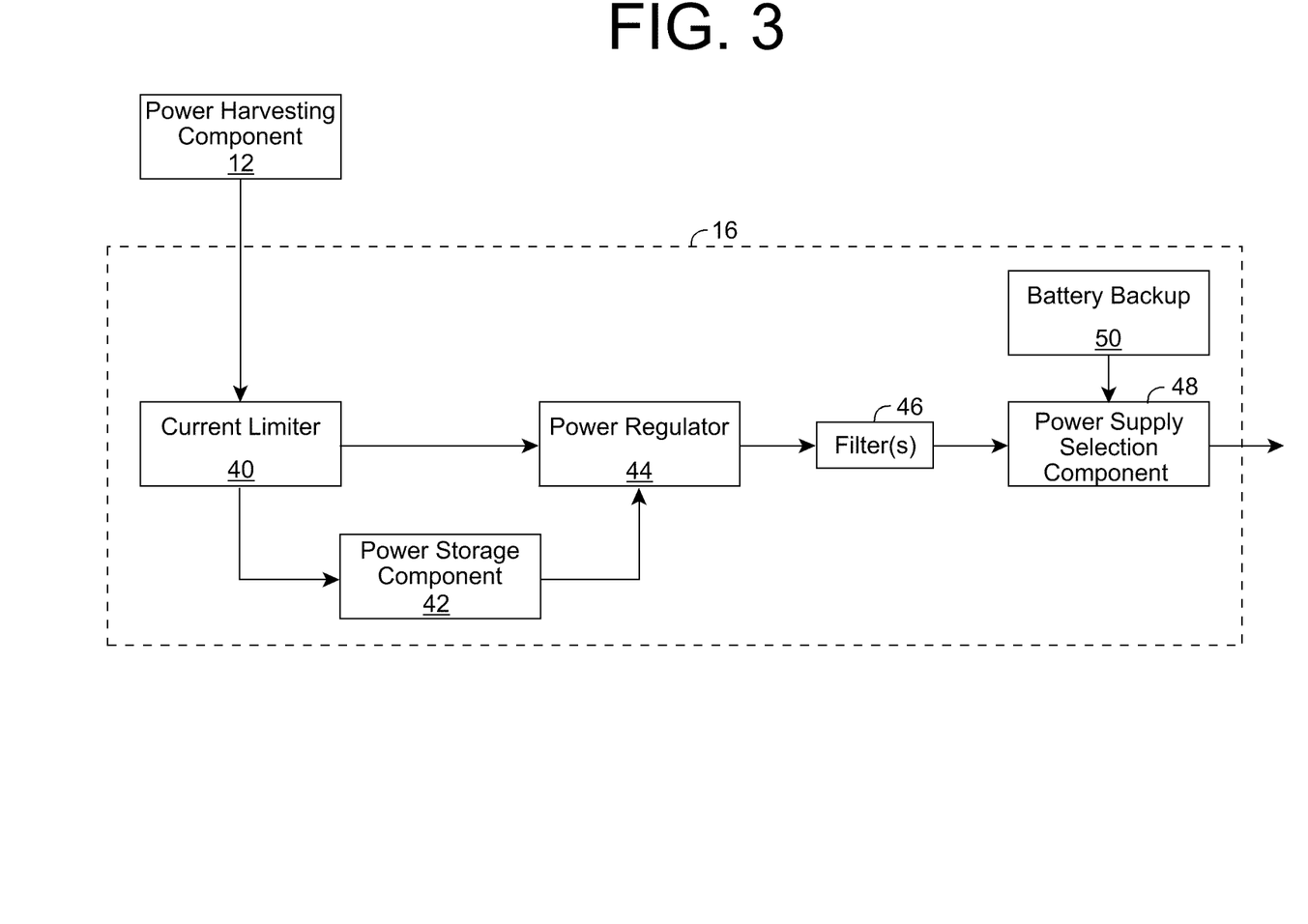
FIG. 3 shows an illustrative embodiment of the power component of FIGS. 1A and 1B according to an embodiment.

As discussed herein, power component 16 can be configured to collect and distribute the power generated by the set of power harvesting components 12. To this extent, FIG. 3 shows an illustrative embodiment of power component 16 according to an embodiment. When a power harvesting component 12 generates power, the power is passed through a current limiter 40, which is configured to limit a total amount of current entering the remainder of power component 16 to a level of current that is safe for operation of the remaining components of sensor node 10 (FIG. 1). Subsequently, the power can be stored in a power storage component 42, such as a supercapacitor, a battery, and/or the like.

Further, power can pass from current limiter 40 and/or power storage component 42 into a power regulator 44, such as a "buck-boost" regulator, which is configured to handle very low voltages. The power regulator 44 converts the highly variable voltages and currents produced by the power harvesting component 12 into a specific set of voltages at levels appropriate to use in the sensor node 10. From the power regulator 44, the power can pass through one or more filters 46, which can be configured to remove noise, or the like. A power supply selection component 48, such as a diode OR, can cause energy to be drawn from the power generated by power harvesting component 12 or from a backup battery 50 if no power is forthcoming from the main power harvesting supply. Electrical power at an appropriate voltage is sent out of power component 16 for use by the remainder of the components of sensor node 10.

It is understood that many other designs of power component 16 are possible. For example, power component 16 can be implemented without one or more of the components shown in FIG. 3, such as filter(s) 46. Further, it is understood that, depending on the likely demand and/or supply, power component 16 can include circuitry to enable the remaining components of sensor node 10 to detect when battery backup 50 is being used, rather than the main power harvesting and storage system, and generate an alarm indicating that sensor node 10 may require repair and/or replacement. In an embodiment, battery backup 50 can be recharged by operation of the power harvesting component 12. In another embodiment, battery backup 50 and power storage component 42 are the same.

Figure 4A:
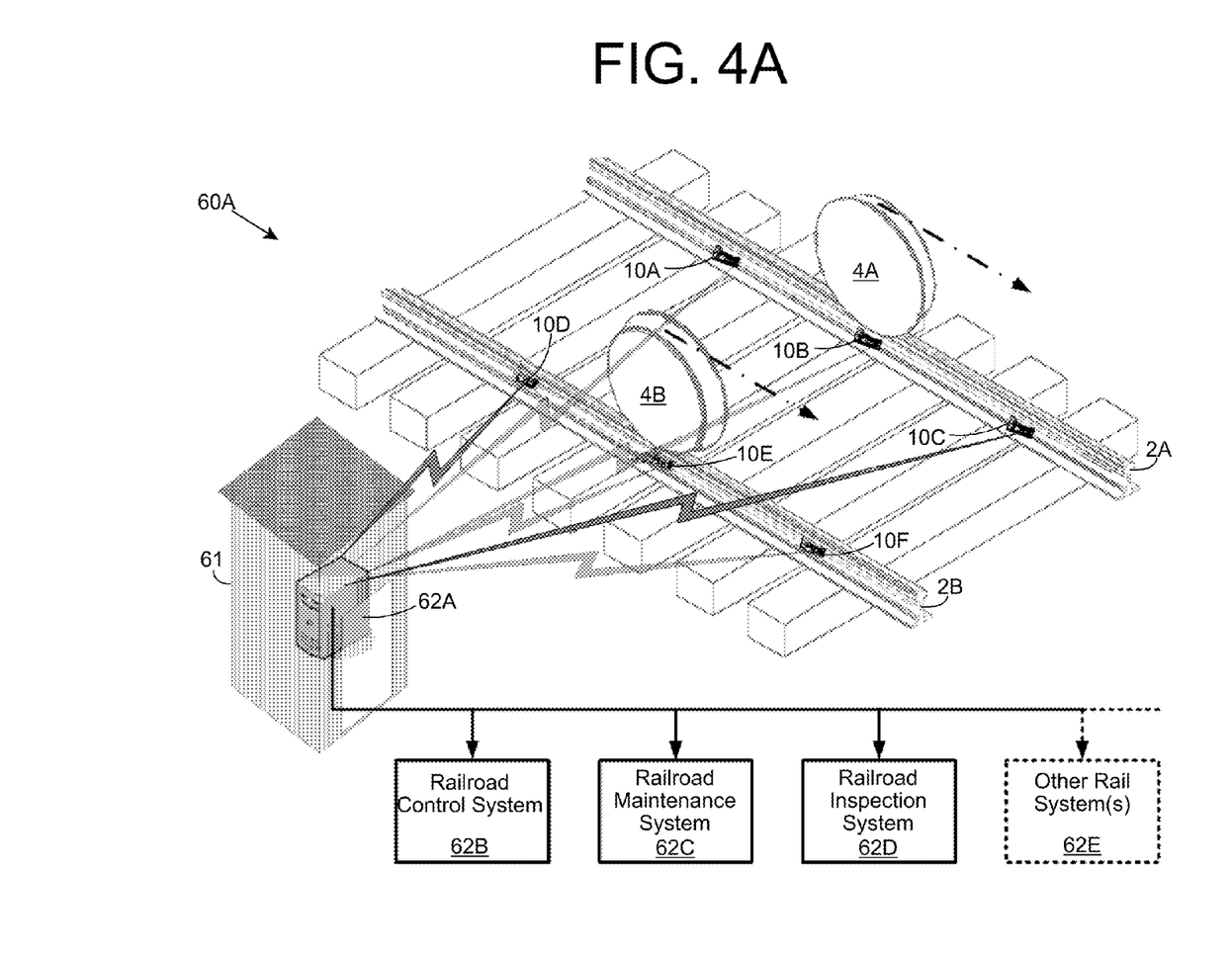
FIGS. 4A and 4B show illustrative systems for monitoring a railroad according to embodiments.
Figure 4B:
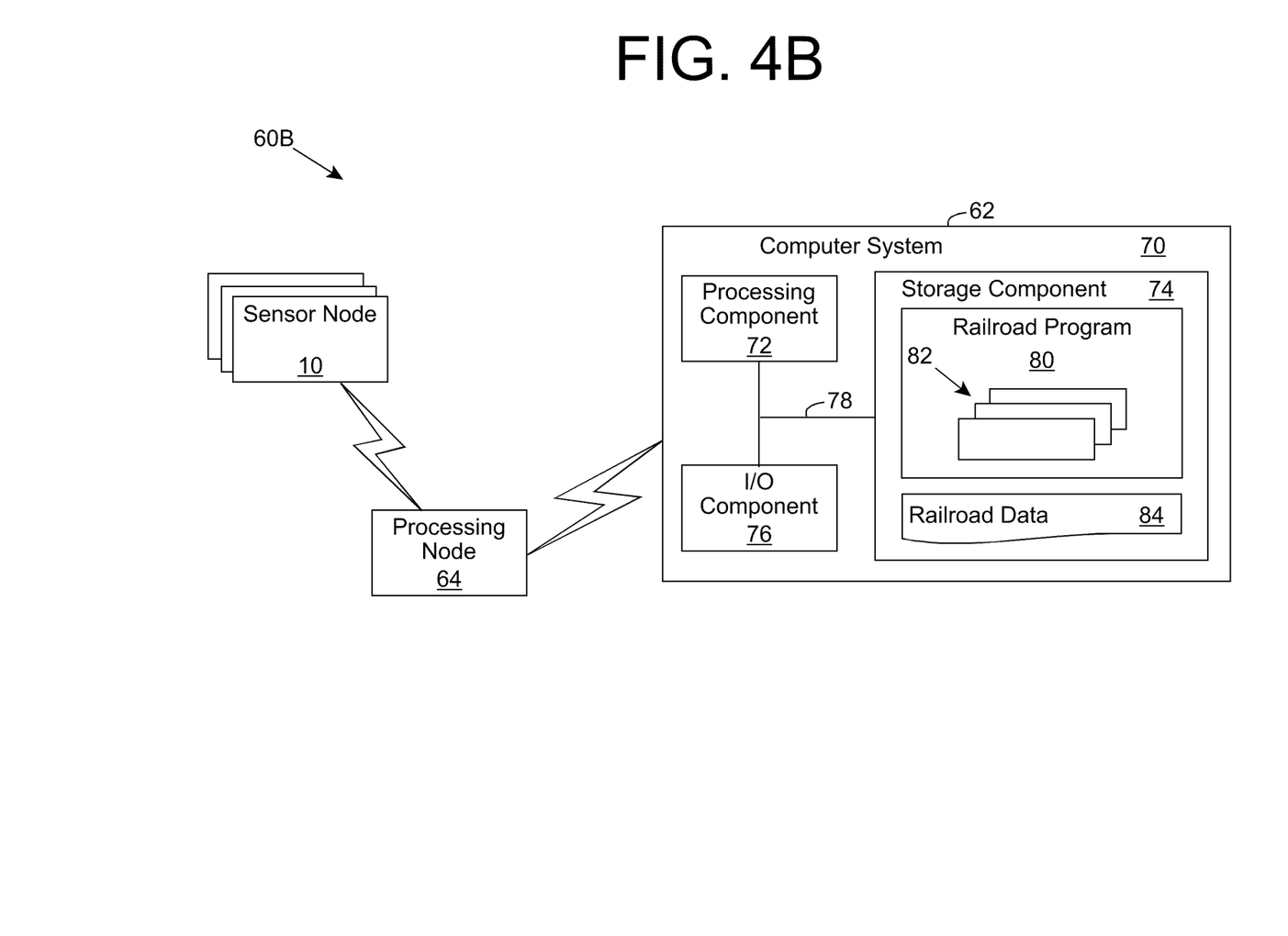

FIGS. 4A and 4B show illustrative systems 60A, 60B, respectively, for monitoring a railroad according to embodiments. As illustrated in FIG. 4A, system 60A includes a plurality of sensor nodes 10A-F, each of which is deployed on a corresponding rail 2A, 2B and is configured to acquire, store, analyze, transmit, and/or the like data on one or more attributes of the rail environment. Further, a sensor node 10A-F can be configured to generate power as rail vehicles having wheels 4A, 4B travel along rails 2A, 2B, respectively.

While six sensor nodes 10A-F are shown, it is understood that any number of sensor nodes 10A-F, from one to hundreds, may be included in system 60A.

A sensor node 10A-F can be affixed to a gauge side of the corresponding rail 2A, 2B. In this manner, the flange of wheels 4A, 4B will pass over the corresponding sensor nodes 10A-F and rails 2A, 2B can provide some level of protection to the sensor nodes 10A-F. However, it is understood that this is only illustrative, and a sensor node 10A-F can be located at other locations with respect to rails 2A, 2B depending, for example, on the corresponding attribute(s) being monitored by the sensor node 10A-F.

Each sensor node 10A-F is configured to transmit data related to the monitored attribute(s) of the rail environment for processing by another computer system, such as one or more railroad systems 62A-E. For example, system 60A is shown including a data collection system 62A, which is configured to receive wireless signals transmitted by each sensor node 10A-F. Further, data collection system 62A can transmit wireless signals to one or more sensor nodes 10A-F, e.g., to control operation of the sensor node(s) 10A-F (trigger readings, power up/down, and/or the like). In an embodiment, the wireless signals comprise radio-frequency signals. However, it is understood that any type of wireless communications solution can be utilized including, for example, light (e.g., laser), infrared, acoustic (sound), and/or the like. Data collection system 62A can be located in a manner to enable communications with sensor nodes 10A-F. To this extent, data collection system 62A can be located adjacent to rails 2A, 2B and protected from the elements in a housing 61, or the like. However, it is understood that data collection system 62A can be located anywhere, e.g., remotely in another area of a rail yard, based on a communications range of the corresponding sensor nodes 10A-F.

Data collection system 62A can receive the data transmitted by sensor nodes 10A-F and process the data. To this extent, data collection system 62A can enable one or more aspects of the railroad to be monitored and/or controlled using the data received from sensor nodes 10A-F. For example, data collection system 62A can process some or all of the data and control the operation of one or more components of system 60A, e.g., sensor nodes 10A-F. Further, data collection system 62A can transmit data relating to the operation of the railroad for processing by one or more other railroad systems. For example, data collection system 62A can provide data on the presence, movement, condition, and/or the like, of a rail vehicle for processing by a railroad control system 62B, which can make decisions about rail vehicle routing and operate one or more railroad components (e.g., switches) accordingly. Similarly, data collection system 62A can provide data on the condition of a rail vehicle (e.g., a wheel of the rail vehicle) for processing by a railroad maintenance system 62C or a railroad inspection system 62D, which can enable maintenance for the vehicle to be scheduled or a follow up inspection of the vehicle to be scheduled, respectively.

It is understood that railroad systems 62B-D are only illustrative, and data collection system 62A can provide data for processing by various other railroad systems 62E. For example, data collection system 62A can provide data for processing by a scheduling system or the like for a rail yard. Additionally, data collection system 62A can provide data for processing by a main line monitoring and control system, such as track signals and track integrity monitors. For example, one or more sensor nodes 10A-F can be configured to monitor an amount of stress/tension in a continuous welded rail 2A, 2B. During installation, such a rail 2A, 2B is normally placed under some nominal tension, and as a result, a sudden reduction in tension/stress can indicate a broken rail 2A, 2B. Similarly, sensor nodes 10A-F can detect when a rail 2A, 2B is under sufficient stress or in sufficiently poor condition to be in imminent danger of breaking.

While sensor nodes 10A-F are shown communicating with a data collection system 62A, it is understood that numerous alternative implementations are possible. For example, sensor nodes 10A-F can be configured to communicate directly with one or more of the other railroad systems 62B-E. Similarly, sensor nodes 10A-F can be configured to communicate with each other, e.g., to relay data transmitted between a more remote sensor node 10A-F and data collection system 62A or the like. Still further, when sensor nodes 10A-F are configured to analyze the sensor data, the sensor nodes 10A-F can be configured to trigger the operation of one or more other devices/systems, such as a signaling device, a switch, and/or the like.

In an illustrative application, system 60A is installed at a rail yard. In this case, one or more sensor nodes 10A-F can be deployed in key locations throughout the various tracks throughout the rail yard. The sensor nodes 10A-F can wirelessly transmit data regarding the rail operations, such as rail traffic, an operating condition of a rail vehicle/rail, and/or the like, for processing by one or more other railroad systems implemented at the rail yard, e.g., a railroad control system 62B configured to route rail vehicles in the rail yard. In another illustrative application, system 60A can be installed along a main line of a railway. In this case, sensor nodes 10A-F can be periodically placed along the rails 2A, 2B to monitor the operating condition of the rail/rail vehicle(s), detect train movement, and/or the like. Sensor nodes 10A-F can communicate data to other systems along the mainline, e.g., track signaling and/or routing, which can use the data to adjust operation accordingly. In other applications, sensor nodes 10A-F can be deployed to monitor various other rail locations, such as bridges, spurs, and/or the like. In each application, sensor nodes 10A-F can be permanently or temporarily deployed. For example, sensor nodes 10A-F can be periodically deployed along sections of a mainline to perform periodic, temporary monitoring of the condition of the rails 2A, 2B. Regardless, in each application, the sensor nodes 10A-F can harvest energy, e.g., via an electromagnetic power generation solution or the like, and acquire data from the passing rail vehicles.

As discussed herein, sensor nodes 10A-F can transmit the data to a computing device, such as data collection system 62A, which can comprise a general purpose computing device executing program code installed thereon. While data collection system 62A is shown located in a housing 61, it is understood that data collection system 62A could be implemented as part of a mobile unit. In this case, the mobile unit can travel along the rails 2A, 2B (e.g., via a rail vehicle or a wheeled vehicle traveling near the rails) and receive data from the sensor nodes 10A-F as it moves. In an embodiment, data collection system 62A signals sensor nodes 10A-F to transmit the data. In this case, each sensor node 10A-F can comprise sufficient storage capacity to store the data for a desired period of time before transmitting it to data collection system 62A. Similarly, data collection system 62A can store the data received from sensor nodes 10A-F for later communication and/or processing by another computer system (e.g., in response to a signal, upon connection with a mobile unit, upon return to a rail yard, and/or the like).

In an embodiment shown in FIG. 4B, system 60B can comprise sensor nodes 10 that transmit data to a computing device that comprises another node, such as a set of processing nodes 64, as shown and described in U.S. Utility patent application Ser. No. 12/469,167, which was previously incorporated by reference. As discussed therein, the processing node 64 can collect sensor data from sensor nodes 10A-F, control network operations for a group of sensor nodes 10A-F, and/or the like. Additionally, the processing node 64 can process the data and/or transmit data regarding the rail operations for processing by another computing device, such as a railroad system 62. The processing node 64 can be used to overcome, for example, a limited range of communication from the sensor nodes 10A-F (e.g., due to space and/or power limitations in the nodes), which is likelier to be a problem when sensor nodes 10A-F are deployed along a main line. In this case, processing nodes 64 can be located and configured to gather and relay the data from sensor nodes 10A-F and/or other processing nodes 64 for processing by a more powerful computing device, such as a railroad system 62, using a more powerful transceiver. Similarly, sensor nodes 10A-F can be configured to transmit and relay data between other sensor nodes 10A-F. In this case, a particularly configured processing node 64 is not necessary, although data collection and transmission by sensor nodes 10A-F may be performed at lower rates due to the use of a portion of the bandwidth of the system in the overhead of administering the sensor node 10A-F network.

In another embodiment, referring to both FIGS. 4A and 4B, sensor nodes 10A-F and/or processing node 64 can transmit data to a railroad system 62, which is installed on a passing train (e.g., a locomotive of the train). In this case, sensor nodes 10A-F can transmit data on the operating condition of one or more components of the train (e.g., the presence of a flat spot on a wheel), data on the operating condition of the rails 2A, 2B, and/or the like. The railroad system 62 can process the data and generate a corresponding alert, when necessary, for presentation to the conductor, who in turn can adjust operation of the train accordingly (e.g., travel at a lower speed).

In still another embodiment, sensor nodes 1A-F can be attached to one or more components of a rail vehicle. In this case, the sensor nodes 10A-F can generate power from, for example, the vibration due to the motion of the train, and acquire data on the operating condition of the rail vehicle. A sensor node 10A-F can be installed anywhere on the rail vehicle, e.g., on the axle bearing mount, on the suspension, on the body of the rail vehicle, and/or the like. Additionally, in addition to or instead of sensing data on the operating condition of the rail vehicle, sensor nodes 10A-F can include data regarding the rail vehicle, such as an identification of the vehicle, information on the cargo (e.g., material, destination, etc.), a maintenance schedule for the rail vehicle, and/or the like. In this case, sensor nodes 10A-F can communicate the data to a railroad system 62, such as railroad control system 62A, which can use the data to route the rail vehicle, schedule maintenance, and/or the like. Similarly, the railroad system 62 can update the data on the sensor node 10A-F, e.g., after maintenance has been completed.

As described herein, one or more of sensor nodes 10A-F, processing node(s) 64, and/or railroad systems 62 can be implemented using a set of processors configured to execute program code, which is stored in a corresponding storage component of the device. In this case, when executed in the corresponding device, the program code makes the device operable to perform the corresponding functions described herein. An illustrative railroad system 62 can be implemented using a computer system 70 that can perform a corresponding process described herein in order to monitor and/or control one or more aspects of a railroad environment using railroad data 84, which can include and/or be generated from sensor data 21 (FIG. 1B) acquired by sensor node(s) 10.

Computer system 70 is shown including a processing component 72 (e.g., one or more processors), a storage component 74 (e.g., a storage hierarchy), an input/output (I/O) component 76 (e.g., one or more I/O interfaces and/or devices), and a communications pathway 78. In general, processing component 72 executes program code, such as railroad program 80, which is at least partially fixed in storage component 74. While executing program code, processing component 72 can process data, which can result in reading and/or writing transformed data from/to storage component 74 and/or I/O component 76 for further processing. Pathway 78 provides a communications link between each of the components in computer system 70. I/O component 76 can comprise one or more human I/O devices, which enable a human user to interact with computer system 70 and/or one or more communications devices to enable a system user, such as processing node 64 and/or sensor nodes 10A-F, to communicate with computer system 70 using any type of communications link. To this extent, railroad program 80 can manage a set of interfaces (e.g., graphical user interface(s), application program interface, and/or the like) that enable human and/or system users to interact with railroad program 80. Further, railroad program 80 can manage (e.g., store, retrieve, create, manipulate, organize, present, etc.) the data, such as railroad data 84, using any solution.

In any event, computer system 70 can comprise one or more general purpose computing articles of manufacture (e.g., computing devices) capable of executing program code, such as railroad program 80, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, railroad program 80 can be embodied as any combination of system software and/or application software.

Further, railroad program 80 can be implemented using a set of modules 82. In this case, a module 82 can enable computer system 70 to perform a set of tasks used by railroad program 80, and can be separately developed and/or implemented apart from other portions of railroad program 80. As used herein, the term "component" means any configuration of hardware, with or without software, which implements the functionality described in conjunction therewith using any solution, while the term "module" means program code that enables a computer system 70 to implement the functionality described in conjunction therewith using any solution. When fixed in a storage component 74 of a computer system 70 that includes a processing component 72, a module is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of computer system 70.

When computer system 70 comprises multiple computing devices, each computing device can have only a portion of railroad program 80 fixed thereon (e.g., one or more modules 82). However, it is understood that computer system 70 and railroad program 80 are only representative of various possible equivalent computer systems that may perform a process described herein. To this extent, in other embodiments, the functionality provided by computer system 70 and railroad program 80 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 70 includes multiple computing devices, the computing devices can communicate over any type of communications link. Further, while performing a process described herein, computer system 70 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A sensor node comprising:
a sensor component configured to acquire sensor data on at least one property of a railroad environment;
a wireless data communications component configured to transmit data related to the at least one property using a wireless communications solution; and
a power harvesting component configured to generate power from motion of a rail vehicle and provide sufficient power to operate the sensor node without access to any additional power sources, wherein the power harvesting component includes a noncontact electromagnetic power generating means for generating power from movement of at least a portion of a component of the rail vehicle through a magnetic field.

2. The sensor node of claim 1, further comprising a data processing component configured to process the sensor data for transmission using the wireless data communications component.

3. The sensor node of claim 1, wherein the noncontact electromagnetic power generating means includes:
a ferrous-cored coil; and
a bias magnet located adjacent to the coil, wherein the coil and magnet are located adjacent to a rail such that a rail wheel of the rail vehicle passes sufficiently close to alter a magnetic field created by the coil and the magnet.

4. The sensor node of claim 3, wherein the sensor component is configured to acquire data based on a presence of at least a portion of the rail wheel in the magnetic field.

5. The sensor node of claim 1, wherein the power harvesting component includes means for generating power based on a strain caused by the motion of the rail vehicle.

6. The sensor node of claim 5, wherein the means for generating power includes a piezoelectric material disposed between a rail along which the rail vehicle moves and a base plate attached to the rail.

7. The sensor node of claim 1, wherein the power harvesting component is further configured to generate power from sunlight.

8. The sensor node of claim 1, further comprising a power component configured to collect and distribute power generated by the power harvesting component, wherein the power component includes:
- a current limiter configured to limit a total amount of current entering the power component;
- a power storage component configured to store the generated power; and
- a power regulator configured to provide power from at least one of: the current limiter or the power storage component.

9. The sensor node of claim 1, wherein all components of the sensor node are enclosed in a single physical structure including means for attaching the sensor node directly to a rail.

10. A railroad monitoring system comprising:
- a set of sensor nodes, each sensor node comprising:
  - a sensor component configured to acquire sensor data on at least one property of a railroad environment;
  - a wireless data communications component configured to transmit data related to the at least one property using a wireless communications solution; and
  - a power harvesting component configured to generate power from motion of a rail vehicle and provide sufficient power to operate the sensor node without access to any additional power sources; and
- a railroad system configured to monitor the at least one aspect of the railroad environment based on the data transmitted from the set of sensor nodes, wherein the power harvesting component of at least one of the set of sensor nodes includes a noncontact electromagnetic power generating means for generating power from movement of at least a portion of a component of the rail vehicle through a magnetic field.

11. The system of claim 10, wherein all components of each of the set of sensor nodes are enclosed in a single physical structure, and wherein the single physical structure for each of the set of sensor nodes is directly attached to a rail in the railroad environment.

12. The system of claim 10, wherein a power harvesting component for a sensor node in the set of sensor nodes includes means for generating power based on a strain caused by the motion of the rail vehicle.

13. The system of claim 10, wherein the railroad system comprises a railroad control system configured to route rail vehicles in a rail yard.

14. The system of claim 10, wherein the railroad system is implemented on a train traveling through the railroad environment, and wherein the railroad system receives the data directly from the set of sensor nodes.

15. The system of claim 10, wherein at least one of the sensor nodes is installed on a rail vehicle of a train traveling through the railroad environment, wherein the at least one of the sensor nodes obtains data on at least one property of the rail vehicle and transmits the data for processing by the railroad system.

16. A sensor node comprising:
- a sensor component configured to acquire sensor data on at least one property of a railroad environment;
- a wireless data communications component configured to transmit data related to the at least one property using a wireless communications solution;
- a data processing component configured to process the sensor data for transmission using the wireless data communications component; and
- a power harvesting component configured to generate power from motion of a rail vehicle and provide sufficient power to operate the sensor node without access to any additional power sources, wherein the power harvesting component includes noncontact electromagnetic power generating means for generating power from movement of at least a portion of a rail wheel through a magnetic field.

17. The sensor node of claim 16, wherein the noncontact electromagnetic power generating means includes:
- a ferrous-cored coil; and
- a bias magnet located adjacent to the coil, wherein the coil and magnet are located adjacent a rail such that the at least a portion of the rail wheel of the rail vehicle passes sufficiently close to alter a magnetic field created by the coil and the magnet.

18. The sensor node of claim 16, wherein all components of the sensor node is enclosed in a single physical structure including means for attaching the sensor node directly to a rail.

19. The sensor node of claim 9, wherein the single physical structure has dimensions less than approximately three inches, and wherein the means for attaching the sensor node directly to a rail includes a magnet.

20. The system of claim 15, wherein the railroad system comprises a railroad control system configured to route rail vehicles in a rail yard.

* * * * *

UNITED STATES PATENT AND TRADEMARK OFFICE
CERTIFICATE OF CORRECTION

PATENT NO.        : 8,423,240 B2
APPLICATION NO.   : 12/493789
DATED             : April 16, 2013
INVENTOR(S)       : Zahid F. Mian Page 1 of 1

It is certified that error appears in the above-identified patent and that said Letters Patent is hereby corrected as shown below:

In the Claims

Column 12, line 59, delete "component includes means" and insert
-- component further includes means --.

Column 14, line 36, delete "sensor node is enclosed" and insert
-- sensor node are enclosed --.

Signed and Sealed this
Sixth Day of August, 2013

Teresa Stanek Rea
*Acting Director of the United States Patent and Trademark Office*